(12) United States Patent
Jones et al.

(10) Patent No.: US 11,808,458 B2
(45) Date of Patent: Nov. 7, 2023

(54) COLLAPSIBLE AND PORTABLE OUTDOOR OVEN

(71) Applicant: OVEN BROTHERS LTD., Ottawa (CA)

(72) Inventors: Gord Jones, Ottawa (CA); Gilles Levesque, Ottawa (CA); Jean-Philippe Normand, Nepean (CA)

(73) Assignee: OVEN BROTHERS LTD., Ottawa (CA)

( * ) Notice: Subject to any disclaimer, the term of this patent is extended or adjusted under 35 U.S.C. 154(b) by 431 days.

(21) Appl. No.: 17/051,349

(22) PCT Filed: May 7, 2018

(86) PCT No.: PCT/CA2018/000084
§ 371 (c)(1),
(2) Date: Oct. 28, 2020

(87) PCT Pub. No.: WO2019/213731
PCT Pub. Date: Nov. 14, 2019

(65) Prior Publication Data
US 2021/0095852 A1    Apr. 1, 2021

(51) Int. Cl.
| | |
|---|---|
| *F24C 1/16* | (2021.01) |
| *A47J 37/07* | (2006.01) |
| *F24B 1/22* | (2006.01) |
| *F24B 5/08* | (2006.01) |
| *F24B 13/02* | (2006.01) |
| *F24C 1/02* | (2021.01) |
| *F24C 15/08* | (2006.01) |

(52) U.S. Cl.
CPC ............. *F24C 1/16* (2013.01); *A47J 37/0759* (2013.01); *F24B 1/22* (2013.01); *F24B 5/087* (2013.01); *F24B 13/02* (2013.01); *F24C 1/02* (2013.01); *A47J 2037/0777* (2013.01); *F24C 15/08* (2013.01)

(58) Field of Classification Search
CPC ..... F24C 1/16; F24C 1/02; F24C 15/08; A47J 37/0759; A47J 2037/0777; F24B 1/22; F24B 5/087; F24B 13/02
See application file for complete search history.

(56) References Cited

U.S. PATENT DOCUMENTS 2,969,055 A * 1/1961 Martin ................ A47J 37/0763
126/274
3,880,139 A * 4/1975 Young ................ A47J 37/0763
126/552

(Continued)

*Primary Examiner* — Alfred Basichas

(57) ABSTRACT

It is contemplated that the present invention can provide a collapsible and portable outdoor oven having a front wall having at least one opening, a rear wall, a top wall, a first side wall, a second side wall, at least one horizontally extending exhaust slot, at least one upwardly and outwardly extending baffle, at least one internal cavity having a rear inner wall, a first inner side wall, a rear inner side wall, an upper inner surface, a lower inner surface and an upwardly and forwardly projecting baffle positioned rearwardly on the lower surface, at least one of the first side wall, the second side wall, rear wall, upper surface and the lower surface comprised of a plurality of refractory brick elements and at least one door element adapted to cover the at least one opening of the front wall.

13 Claims, 11 Drawing Sheets

(56) References Cited

U.S. PATENT DOCUMENTS

| | | | | |
|---|---|---|---|---|
| 6,672,303 B1* | 1/2004 | Emter | ................. | A47J 37/0713 |
| | | | | 126/41 R |
| 11,439,274 B2* | 9/2022 | Battel | ................. | A47J 37/0713 |
| 2014/0326720 A1* | 11/2014 | Probst | ....................... | F24B 1/00 |
| | | | | 220/6 |
| 2019/0086094 A1* | 3/2019 | Kao | ....................... | F24B 1/022 |

* cited by examiner

COLLAPSIBLE AND PORTABLE OUTDOOR OVEN

FIELD

The present invention relates to the field of outdoor cooking appliances. More specifically, the present invention relates to portable outdoor brick ovens that are affordable to manufacture, durable, easy to ship, easy to assemble and which can generate and withstand the significant temperatures that are incurred when combusting typical cooking fuels such as but not limited to charcoal or wood.

BACKGROUND

Ovens that contain and concentrate valuable heat energy for the purposes of cooking various food products have been known since antiquity. Such ovens can be made from stone, wattle-and-daub, concrete, brick or any other suitably durable material that can withstand the severe thermal shocks that occur when commonly available fuel is openly combusted and the resultant heat is harnessed within the confines of the oven cavity for cooking purposes.

Given the severe temperatures that are generated by this open combustion, in some climates it is not uncommon to locate such ovens outdoors. Moreover, historically it was not uncommon for an oven to be a community or commercial resource located in a communal space outside a private residence where this valuable resource can be accessed by a large number of people.

Traditional outdoor ovens were constructed in a variety of forms. For example, some outdoor ovens combusted fuel in the same cavity where the food is cooked while in other arrangements the combustion cavity is separate from the cooking cavity. One of the drawbacks of using a combined combustion and cooking cavity is that food being cooked can be exposed to combustion by-products (such as soot, ash or combustion gases) that can have adverse health or culinary effects.

However, ovens that utilize separate cavities for combustion and cooking are generally larger and must be constructed in a manner such that heat is efficiently transferred from the combustion cavity to the cooking cavity, which can potentially require more robust and carefully considered construction techniques.

More recently, portable outdoor ovens have been developed for residential use so that individuals can recreate the culinary and cultural experience of cooking in an outdoor oven on a smaller scale.

However, given the aforementioned challenges that an effective outdoor oven must overcome even portable outdoor ovens must be constructed in a significantly robust manner which can result in a product that is quite heavy and bulky, difficult to ship and which requires sophisticated manufacturing techniques (for example, welding, metal fabrication or masonry work) in order to assemble the oven.

As a result, such portable outdoor ovens can be expensive to manufacture and quite immobile in order to ensure that the product is sufficiently durable and weather resistant. Moreover, many available prior art portable ovens do not permit the modular replacement of internal components that can be subject to wear and failure given the rather challenging operating conditions that a product of this nature endures.

On other hand, a portable oven that is not constructed in a robust enough manner will have a short lifespan, can provide poor results and can even introduce safety hazards to a residential environment.

Therefore, there is need for a portable outdoor oven that is affordable to manufacture, durable, easy to ship, easy to assemble and which can generate and withstand the significant temperatures that are incurred when combusting typically available cooking fuels such as but not limited to charcoal or wood.

BRIEF SUMMARY

It is contemplated that the present invention can provide a portable outdoor oven that is affordable to manufacture, durable, easy to ship, easy to assemble and which can generate and withstand the significant temperatures that are incurred when combusting typically available cooking fuels.

In at least one embodiment, it is contemplated that the present invention provides a collapsible and portable outdoor oven, having a front wall having an upper edge, a first side edge and a second side edge, the front wall having at least one opening, at least one of the upper edge, the first side edge and the second side edge having one of a plurality of longitudinally aligned angular tabs and a plurality of longitudinally aligned slots, a rear wall having an upper edge, a front edge and a rear edge, at least one of the upper edge, the front edge and the rear edge having one of a plurality of longitudinally aligned angular tabs and a plurality of longitudinally aligned slots, a top wall having a front edge, a rear edge, a first side edge and a second side edge, at least one of the front edge, the rear edge, the first side edge and the second side edge having one of a plurality of longitudinally aligned angular tabs and a plurality of longitudinally aligned slots, a first side wall having a front edge, a rear edge and an upper edge, at least one of the upper edge, the front edge and the rear edge having one of a plurality of longitudinally aligned angular tabs and a plurality of longitudinally aligned slots, a second side wall having a front edge, a rear edge and an upper edge, at least one of the upper edge, the front edge and the rear edge having one of a plurality of longitudinally aligned angular tabs and a plurality of longitudinally aligned slots, at least one of the upper edge of the front wall, the upper edge of the rear wall, the upper edge of the first side wall and the upper edge of the second side wall having at least one horizontally extending exhaust slot positioned adjacent to the respective upper edge, at least one of the upper edge of the front wall, the upper edge of the rear wall, the upper edge of the first side wall and the upper edge of the second side wall having at least one upwardly and outwardly extending baffle positioned adjacent to the respective upper edge on an inner surface of the respective upper edge, at least one internal cavity communicating with the at least one opening of the front wall and having a rear inner wall, a first inner side wall, a second inner side wall, an upper inner surface, a lower inner surface and an upwardly and forwardly projecting baffle positioned rearwardly and adjacent to the lower surface of the at least one internal cavity, at least one of the first side wall, the rear side wall and the lower surface comprised of a plurality of refractory brick elements, at least one door element, the at least one door element adapted to cover the at least one opening of the front wall, wherein at least one of the one of a plurality of longitudinally aligned angular tabs and a plurality of longitudinally aligned slots of the upper edge of the rear wall are securely received by a corresponding other of the one of a plurality of longitudinally aligned angular tabs and a plurality of longitudinally aligned slots of the rear edge of the top wall, the one of a plurality of longitudinally aligned angular tabs and a plurality of longitudinally aligned slots of the first side edge of the rear wall are securely received by a corresponding other of the one of a plurality of longitudinally aligned angular tabs and a plurality of longitudinally aligned slots of the rear edge of the first side wall, the one of a plurality of longitudinally aligned angular tabs and a plurality of longitudinally aligned slots of the second side edge of the rear wall are securely received by a corresponding other of the one of a plurality of longitudinally aligned angular tabs and a plurality of longitudinally aligned slots of the rear edge of the second side wall, the one of a plurality of longitudinally aligned angular tabs and a plurality of longitudinally aligned slots of the upper edge of the front wall are securely received by a corresponding other of the one of a plurality of longitudinally aligned angular tabs and a plurality of longitudinally aligned slots of the front edge of the top wall, the one of a plurality of longitudinally aligned angular tabs and a plurality of longitudinally aligned slots of the first side edge of the front wall are securely received by a corresponding other of the one of a plurality of longitudinally aligned angular tabs and a plurality of longitudinally aligned slots of the front edge of the first side wall, the one of a plurality of longitudinally aligned angular tabs and a plurality of longitudinally aligned slots of the second side edge of the front wall are securely received by a corresponding other of the one of a plurality of longitudinally aligned angular tabs and a plurality of longitudinally aligned slots of the front edge of the second side wall, the one of a plurality of longitudinally aligned angular tabs and a plurality of longitudinally aligned slots of the first side edge of the top wall are securely received by a corresponding other of the one of a plurality of longitudinally aligned angular tabs and a plurality of longitudinally aligned slots of the upper edge of the first side wall, and the one of a plurality of longitudinally aligned angular tabs and a plurality of longitudinally aligned slots of the second side edge of the top wall are securely received by a corresponding other of the one of a plurality of longitudinally aligned angular tabs and a plurality of longitudinally aligned slots of the upper edge of the second side wall.

DESCRIPTION OF THE DRAWINGS

The present invention will be better understood in connection with the following Figures, in which.

DETAILED DESCRIPTION OF THE EMBODIMENTS

Figure 1:
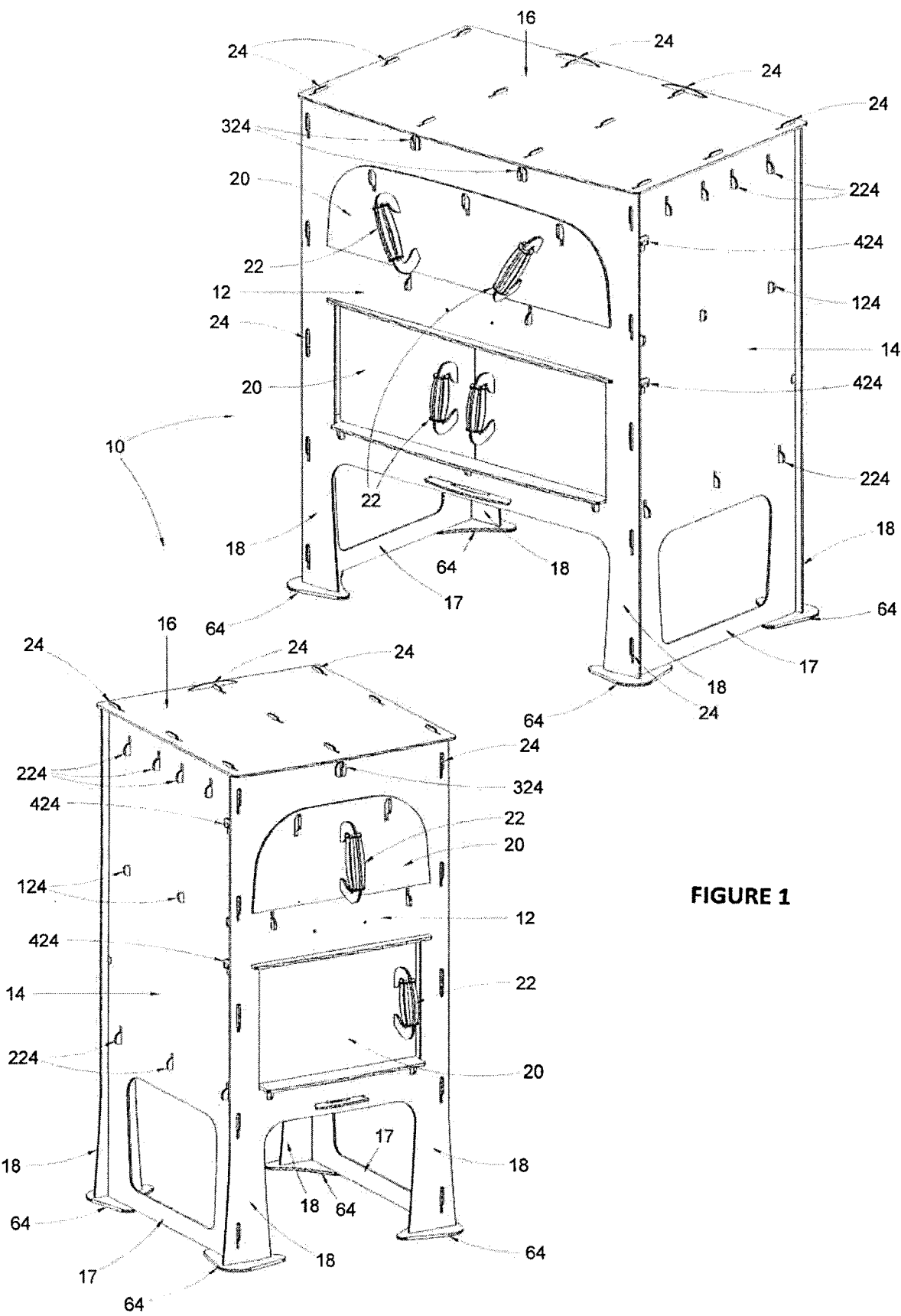
FIG. 1 is a perspective view of two embodiments of a collapsible and portable outdoor oven in accordance with the present invention.

It is contemplated that the present invention can provide a portable outdoor oven that is affordable to manufacture, durable, easy to ship, easy to assemble without requiring extensive mechanical hardware and which can generate and withstand the significant temperatures that are incurred when combusting typical cooking fuels.

It is contemplated that the present invention can be constructed of variety of materials provided that the selected materials are suitably heat resistant and physically durable, including but not limited to stainless steel, cast iron, aluminum, titanium and various alloys, among any other suitable materials that will be readily appreciated by the skilled person.

It is contemplated that the individual components of the present invention can be manufactured using any number of suitable techniques including but not limited to casting, plasma cutting, milling and iron-working, among any other suitable manufacturing techniques that will be readily appreciated by the skilled person.

It is contemplated that the components of the present invention can be proportioned and sized according to the needs of the particular end user application, as will be readily understood by the skilled person.

In at least one embodiment of the present invention it is contemplated that all of the components discussed herein can be manufactured out of plate steel in order to ensure the simplicity of manufacture and shipping, given that all components can be "packed flat" in order to ensure that an entire oven kit can be shipped in an economical and efficient manner.

It is contemplated that a collapsible and portable outdoor oven in accordance with the present invention has a front wall, a rear wall, a first side wall, a second side wall and a top wall that can be securely yet releasably assembled to create a generally rectangularly prismatic oven body as will be discussed in further detail below.

In some embodiments, it is contemplated that the collapsible and portable outdoor oven can have a plurality of downwardly projecting legs for supporting the oven. Furthermore, in some embodiments it is contemplated that each of these downwardly projecting legs can further include a generally planar foot element.

It is contemplated that front wall includes at least one opening and the oven body encloses at least one internal cavity that communicates with the at least one opening. It is contemplated that the internal cavity can be defined by a rear inner wall, a first inner side wall, a second inner side wall, a lower inner surface and, optionally, an upper inner surface to form a generally rectangularly prismatic internal cavity.

It is further contemplated that at least one door is provided that corresponds to the at least one opening. The door can take a variety of forms and can be hinged, pivoting or otherwise attached to the front wall of the oven and it is contemplated that the door includes at least one handle that, in some embodiments can be a heat resistant handle.

In some embodiments, it is contemplated that the at least one opening further comprises at least an upper sill and a lower sill. In these embodiments it is contemplated that the sills can be horizontally oriented generally planar elements, although other arrangements are also contemplated.

It is contemplated that at least one of the rear inner wall, the first inner side wall, the second inner side wall, the lower inner surface and the (optional) upper inner surface of the internal cavity can be comprised of a plurality of refractory bricks, so that heat generated through the combustion of fuel can be retained in the at least one internal cavity. In some embodiments, it is contemplated that the refractory bricks can be retained against the inner surfaces of the outer walls of the oven by way of a provided support or a lateral support, as will be discussed in further detail below.

Suitable refractory bricks can come in any number of formats as will be understood by the skilled person. For example, it is contemplated that a suitable refractory brick can be a rectangularly prismatic refractory brick or any other shape that is required by the particular end user application. It is contemplated that a suitable refractory brick can be constructed of any suitable materials that can withstand the extreme mechanical, chemical, or thermal stresses that will be experienced in an open flame combustion environment.

In some embodiments, it is contemplated that the lower inner surface of the at least one internal cavity is comprised of a number of refractory bricks that are supported on a rectangularly oriented planar grid element that extends horizontally across and from the front to the back of the at least one internal cavity. In some embodiments, it is contemplated that the planar grid element is comprised of a number of perpendicularly oriented, longitudinally extending components perpendicularly arranged in a grid pattern. In at least one embodiment it is contemplated that the planar grid element is comprised of a plurality of lateral supports arranged in a perpendicular grid pattern with a plurality of supports that extend from the front to the back of the oven.

In this respect, it is contemplated that a variety of fuel can be combusted in the at least one cavity in order to generate heat that can be harnessed for cooking. For example, it is contemplated that wood, coal, charcoal, natural gas and propane can all be combusted in the at least one internal cavity in order to generate heat that can be harnessed for cooking.

As will be readily understood by the skilled person, in embodiments where hydrocarbon gasses are combusted it is contemplated that suitable burners and piping and other combustion means will be provided in order to provide safe and controlled combustion of the gasses. On the other hand, in embodiments where wood or charcoal is combusted it is contemplated that no additional hardware or componentry is required in order to provide controlled combustion of these solid fuels.

In some embodiments, it is contemplated that the at least one cavity is a single cooking/combustion cavity wherein fuel can be combusted and food cooked within the same cavity, similar to many traditional brick pizza or bakery ovens.

In some embodiments, the at least one opening is two separate openings and the at least one internal cavity is two separate internal cavities that can communicate with one another through a duct. In this embodiment, it is contemplated that the at least one internal cavity is a first combustion cavity provided beneath a second cooking cavity.

In these embodiments it is contemplated that at least one of the first inner side wall, the second inner side wall, the lower inner surface the (optional) upper inner surface of the second cooking cavity are comprised of a plurality of refractory bricks in order to retain heat within the second cooking cavity.

In some embodiments, it is contemplated that at least some of the inner surfaces of the second cooking cavity are lined with a plurality of refractory bricks and at least some of the inner surfaces of the first combustion cavity are defined by a plurality of plate steel components. In some embodiments, it is contemplated that at least some of these plate steel components are perforated plate steel components.

In at least one embodiment, it is contemplated that the upper inner surface of the first combustion cavity is sloped upwardly from the front of the first combustion cavity to the rear of the first combustion cavity so that heat generated within the first combustion cavity rises to the rear of the first combustion cavity where it can pass to the second cooking cavity by way of a horizontal duct positioned at the rear of and between the two cavities as discussed in further detail below.

In these embodiments, it is further contemplated that a horizontal duct can be provided at a rearward location between the lower inner surface of the second cooking cavity and the upper inner surface of the first combustion cavity. In this way, heat generated within the combustion cavity can pass from the first combustion cavity to the second cooking cavity.

In this embodiment, it is further contemplated that an upwardly and forwardly projecting horizontal baffle can be provided adjacent to the horizontal duct in the second cooking cavity in order to direct heat upwardly into the second cooking cavity during the cooking process as will be discussed in further detail below.

It is contemplated that at least one of the front wall, the rear wall, the first side wall and the second side wall further include an exhaust duct that is positioned adjacent to an upper edge of the particular wall under consideration. In at least one embodiment, it is contemplated that the exhaust duct is horizontally oriented and generally aligned parallel with the upper edge of the particular wall under consideration as will be discussed in further detail below.

It is contemplated that at least one of the front wall, the rear wall, the first side wall and the second side wall further include an inwardly and upwardly projecting baffle that is located adjacent the upper edge of the particular wall under consideration and which extends from horizontally across the particular wall under consideration.

In at least one embodiment, it is contemplated that the lower inner surface of the first combustion cavity further comprises a removeable planar grate component that can be removed from the first combustion cavity in order to permit cleaning of the first combustion cavity.

In some embodiments, it is contemplated that the lower inner surface of the first combustion cavity further comprises an opening for disposing of ash or other combustion material. In these embodiments it is contemplated that this opening can be closed by a sliding element that projects through a slot provided in the front wall of the oven as will be discussed in further detail below.

In this way, it is contemplated that the sliding element (and, optionally, the planar grate component) can be removed from the opening by way of the slot and the sliding element can be used as a scraper to scrape ash from the first combustion cavity through the hole in the lower inner surface of the first combustion cavity, as will be discussed in further detail below.

It is contemplated that the front wall, the rear wall, the first side wall, the second side wall and the top wall (and any other components discussed herein) can be interconnected by a system of interfitting slots and angular tabs that allow the resultant oven to be assembled without the need for any tools, mechanical fasteners or permanent construction techniques such as casting or welding.

More specifically, in some embodiments it is contemplated that the perimeter edges (and, optionally, the central planar portions) of each wall component can have either a plurality of longitudinally aligned slots, a plurality of longitudinally aligned tabs or a mixture of longitudinally aligned slots and tabs. It is contemplated that each tab on a wall component aligns with a corresponding slot on an adjacent wall component and these corresponding tabs interfit within the corresponding slots in a secure but removable manner as will be discussed in further detail below.

In at least one embodiment it is contemplated that the tabs are angular tabs that interfit with a corresponding slot in a secure but removeable manner. Moreover, in some embodiments a pin element is provided that can secure the tab within the corresponding slot.

It is contemplated that a number of lateral supports can extend laterally from one side of the oven to the other side of the oven. In these embodiments, it is contemplated that the ends of the lateral support can have angular tabs that securely but releasably interfit within a corresponding slot provided on the respective side wall components as will be discussed in further detail below.

Similarly, it is also contemplated that a number of supports extend from the front of the oven to the back of the oven. In these embodiments, it is contemplated that the ends of these supports can have angular tabs that securely but releasably interfit within a corresponding slot provided on the front wall or the rear wall components as will be discussed in further detail below.

In some embodiments, it is contemplated that both the lateral supports and the supports can bias a refractory brick against the inner surface of an adjacent wall component in order to secure the refractory brick in place as will be discussed in further detail herein.

Turning to FIG. 1, two perspective views of two embodiments of a collapsible and portable oven in accordance with the present invention are illustrated. In these embodiments, each oven 10 includes a front wall 12, a first side wall 14, a second side wall 14, a top wall 16 and a rear wall (not shown) that collectively define a rectangularly prismatic oven body. In these embodiments each oven 10 further includes a plurality of integrally formed downwardly projecting legs 18 each having a generally planar foot element 64. In this embodiment, a horizontal brace 17 is provided between each front leg 18 and the correspondingly aligned rear leg 18.

In these embodiments, it is contemplated that the at least one internal cavity is a first combustion cavity positioned beneath a second cooking cavity as will be discussed in greater detail below. As a result, the at least one opening is a first opening that communicates with the first combustion cavity and a second opening that communicates with the second cooking cavity. In this embodiment, each opening further includes at least one first door 20 and at least one second door 20 and each door 20 includes at least one handle 22.

In these embodiments it is contemplated that the front wall 12, first side wall 14, second side wall 14, top wall 16 and rear wall (not shown) fit together to form a rectangularly prismatic oven body by way of a system of interfitting tabs and slots 24, as will be discussed in further detail below. It is contemplated that each instance of a system of interfitting tabs and slots 24 includes a tab that is securely but removably received in a corresponding rectangular slot, as will be discussed in further detail below. It is also contemplated that a number of other analogous embodiments of systems of interfitting tabs and slots 24, 124, 224, 324, 424 can also be employed in the present invention as will be discussed in further detail herein.

Figure 2:
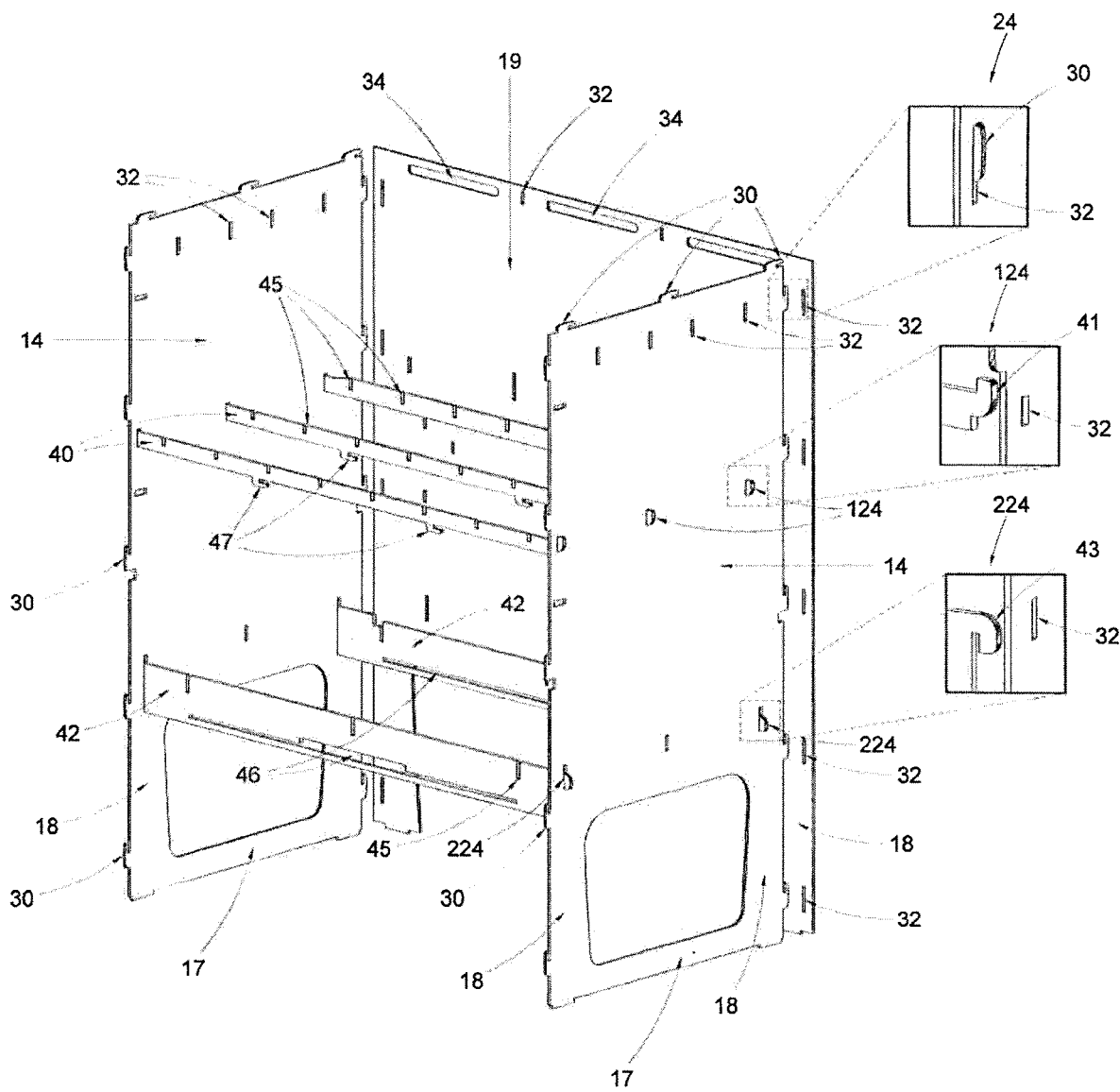
FIG. 2 is a partially assembled perspective view of one of the embodiments of FIG. 1.

Turning to FIG. 2, a partially assembled perspective view of one embodiment of a collapsible and portable oven in accordance with the present invention is illustrated. In this embodiment, first side wall 14 is secured to second side wall 14 by way of a plurality of upper lateral supports 40 and a plurality of lower lateral supports 42. It is contemplated that each upper lateral support 40 has a first end and a second end that each terminate in an angular tab 41. Moreover, it is similarly contemplated that each lower lateral support 42 has a first end and a second end that each terminate in an angular tab 43. In this embodiment, downwardly projecting legs 18 and horizontal braces 17 are integrally part of the first and second side walls 14 and rear wall 19.

In this embodiment, it is contemplated that each upper lateral support 40 and each lower lateral support 42 can include a number of intermediary vertical slots 45 for receiving further components as will be readily understood by the skilled person. Moreover, it is contemplated that at least one of the upper lateral supports 40 and the lower lateral support 42 can include a horizontal slot 46 for receiving a further planar component. Finally, it is contemplated that at least one of the upper lateral supports 40 and the lower lateral supports 42 can further include an intermediary angular tab 47 that can engage a further slotted component as will be discussed in further detail below.

In this embodiment, both first and second side walls 14 include a plurality of outwardly projecting angular tabs 30 located around at least a portion of the perimeter of each side wall 14. Moreover, in this embodiment it is contemplated that each side wall 14 includes a plurality of linearly aligned rectangular slots 32 across a central planar portion of side wall 14. In this way, it is contemplated that the angular tabs 41 of upper lateral support 40 correspondingly engage with a corresponding rectangular slot 32 provided on the central planar portion of side wall 14. Similarly, it is contemplated that the angular tabs 43 of lower lateral support 42 correspondingly engage with a corresponding rectangular slot 32 provided on the central planar portion of side wall 14. In this way, first and second side walls 14 are secured laterally relative to one another in a secure but releasable manner as will be readily understood by the skilled person.

In this embodiment, it is contemplated that rear wall 19 is provided having integral downwardly projecting legs 18 and a number of linearly aligned rectangular slots 32 about at least a portion of the perimeter edge of rear wall 19. Moreover, it is contemplated that rear wall 19 has at least one horizontally extending exhaust duct 34 located parallel to and adjacent to the upper edge of rear wall 19.

In this way, it is contemplated that the angled tabs 30 provided about at least a portion of the perimeter edge of the side walls 14 securely yet releasably engage with corresponding slots 32 provided about at least a portion of the perimeter edge of the rear wall 19 in order to partially define a rectangularly prismatic oven body.

As discussed previously, it is also contemplated that a number of embodiments of systems of interfitting tabs and slots 24, 124, 224 can be employed in the present invention. For example, system of interfitting tabs and slots 24 are comprised of angled tabs 30 and slots 32, system of interfitting tabs and slots 124 are comprised of upwardly angled tabs 41 and slots 32, and system of interfitting tabs and slots 224 are comprised of downwardly angled tabs 43 and slots 32.

Figure 3:
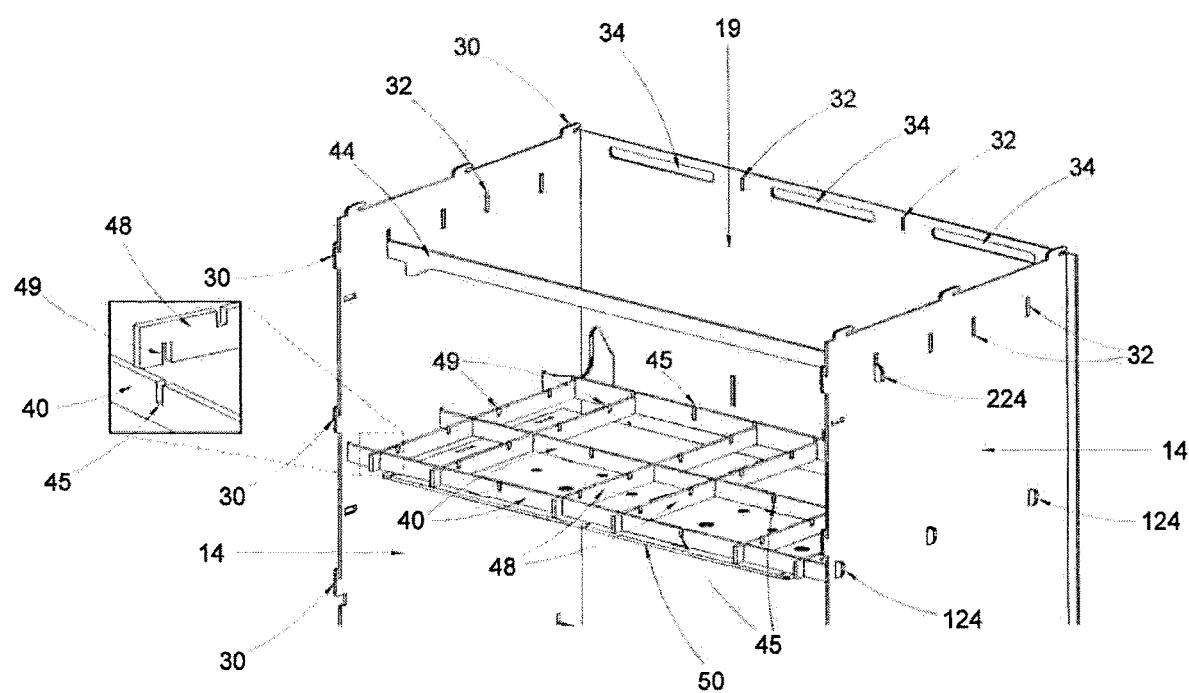
FIG. 3 is a partially assembled perspective view of one embodiment of an upper cooking cavity in accordance with the embodiment of FIG. 2.

Turning to FIG. 3, a partially assembled perspective view of one embodiment of an upper cooking cavity in accordance with the present invention is illustrated. As discussed previously, in this embodiment side walls 14 are secured to one another by a series of upper lateral supports 40 by way of a system of interfitting tabs and slots 124 that include securely engaged angled tabs 41 and corresponding slots 32 and the rear wall 19 is secured to the side walls 14 by an analogous system of angled tabs 30 and corresponding slots 32 to form a generally prismatic oven body. At least one additional upper lateral supports 44 is provided to secure the side walls 14 to one another by way of a system of interfitting tabs and slots 224 consisting of securely engaged angled tabs 43 and corresponding slots 32.

In this embodiment, it is contemplated that a plurality of supports 48 are provided that extend from the front of the oven to the rear of the oven and that each support 48 has a first end and a second end. In some embodiments it is contemplated that each support 48 terminates in an angular tab as will be discussed in further detail below.

Moreover, it is contemplated that each support 48 can include an intermediary vertical slot 49 for receiving a further component. In this embodiment, it is contemplated that support 48 is received in a corresponding intermediary vertical slot 45 provided in upper lateral support 40 in order to create a planar grid element that functions as a supporting component of a lower inner surface of a second cooking cavity as will be discussed in further detail below.

Moreover, in this embodiment it is contemplated that a perforated planar element 50 is temporarily supported below the planar grid element during assembly and which has a number of perimeter rectangular slots (not shown) that each correspondingly and securely yet releasably engage with intermediary the angular tabs 47 provided on the upper lateral supports 40 in order to form the upper inner surface of a first combustion cavity as will be discussed in further detail below with respect to FIG. 5.

Figure 4:
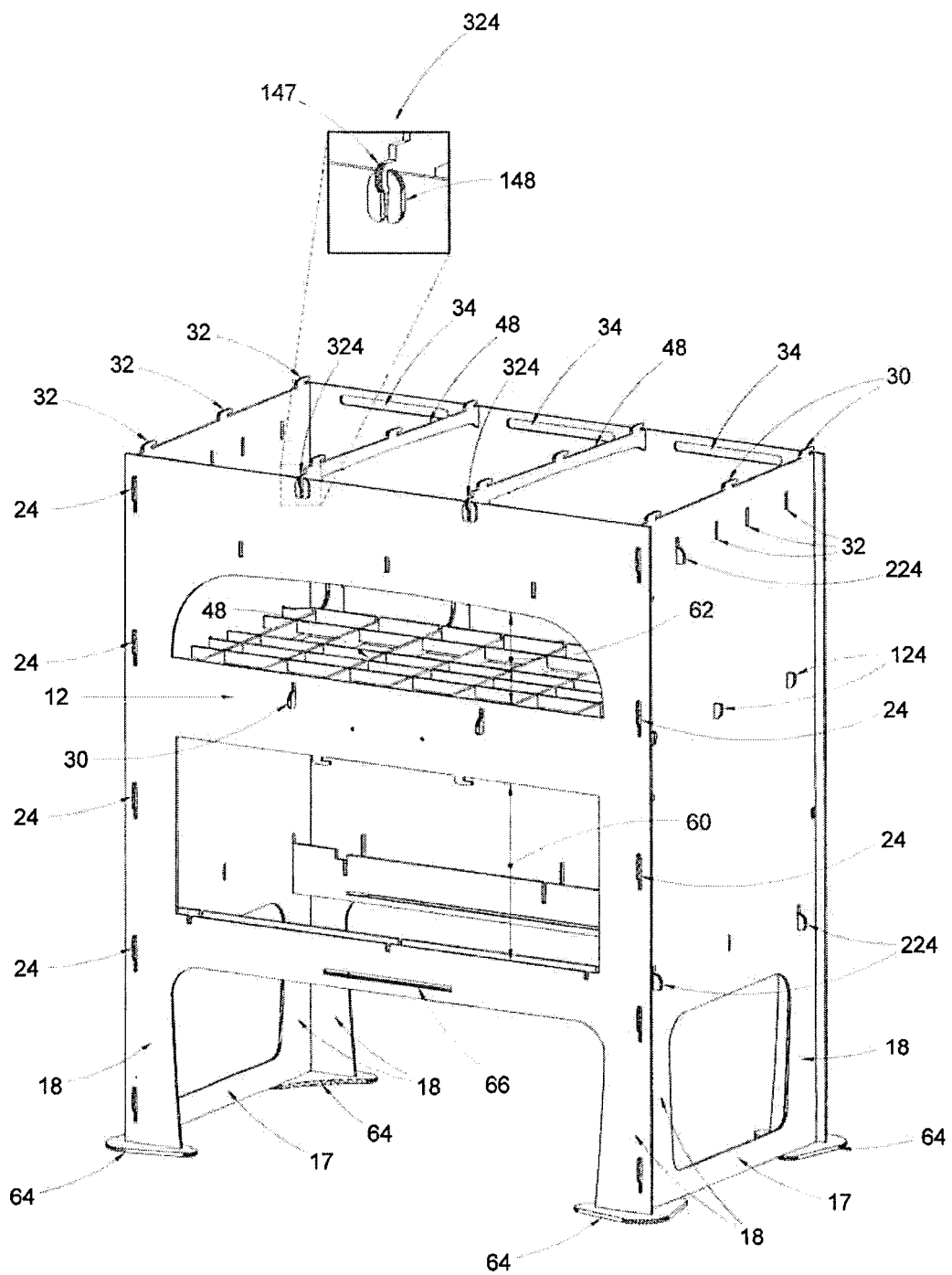
FIG. 4 is another partially assembled perspective view of a collapsible and portable outdoor oven in accordance with the embodiment of FIG. 2.

Turning to FIG. 4, a partially assembled perspective view of one embodiment of a collapsible and portable oven in accordance with the present invention is illustrated. In this embodiment, a front wall 12 is provided wherein the at least one opening is a first opening 60 that communicates with a first combustion cavity and a second opening 62 that communicates with a second cooking cavity. In this embodiment, front wall 12 has integrally formed downwardly projecting legs 18 and a number of linearly aligned rectangular slots 32 are provided about at least a portion of the perimeter edge of front wall 12. In this embodiment, downwardly projecting legs 18 include a generally planar foot element 64. Moreover, it is contemplated that front wall 12 further includes a horizontal slot 66 that can receive a planar component, as will be discussed in further detail below.

Moreover, it is contemplated that in this embodiment that a plurality of supports 48 are provided extend from the front of the oven to the rear of the oven and that each support 48 has a first end and a second end. In this embodiment each end further includes a system of interfitting tabs and slots 324 that includes a tab 147 that securely yet releasably engages a corresponding horizontal slot 32 provided on each of front wall 12 and rear wall 19. Moreover, it is contemplated that angular tab 147 can include a hole that receives a horse collar pin 148. In this way, it is contemplated that the angled tabs 30 provided about at least a portion of the perimeter edge of the side walls 14 securely yet releasably engage with corresponding slots 32 provided about at least a portion of the perimeter edge of the rear wall 19 and front wall 12 in order to define a rectangularly prismatic oven body.

Figure 5:
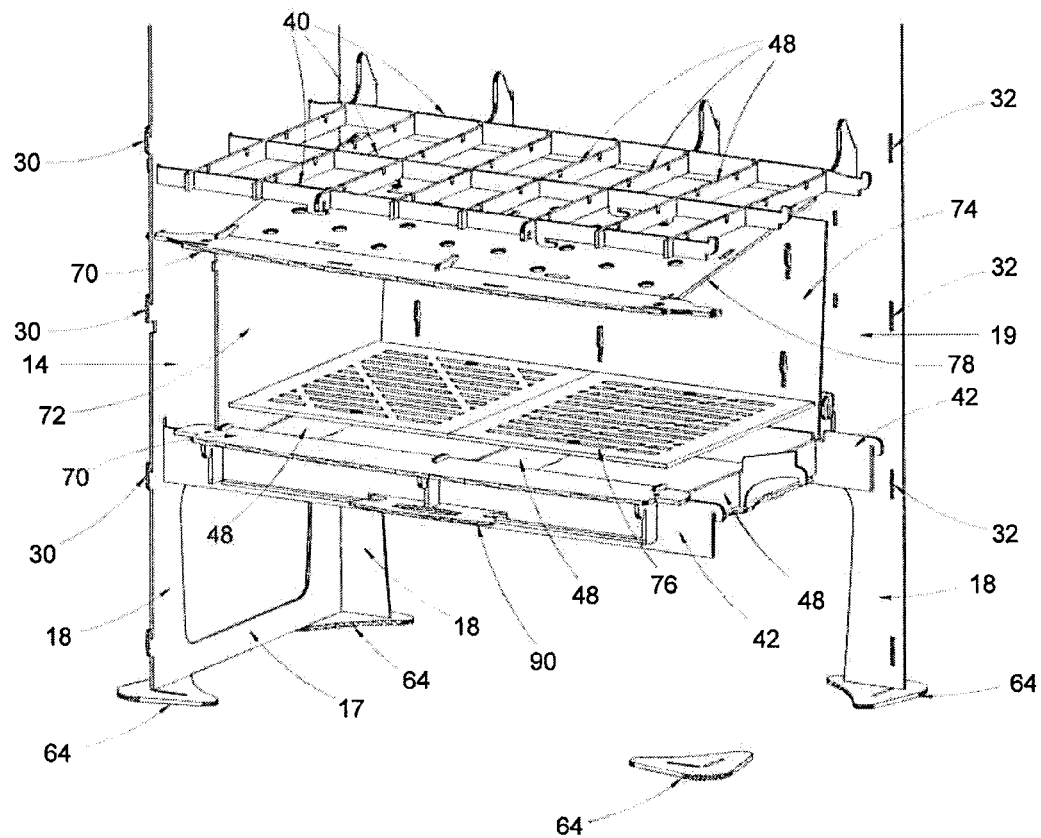
FIG. 5 is a partially assembled perspective view of at least one embodiment of a lower combustion cavity in accordance with the embodiment of FIG. 2.

Turning to FIG. 5, a partially assembled perspective view of at least one embodiment of a first combustion cavity in accordance with the present invention is illustrated. In this embodiment, second opening is defined by a first upper sill 70 and a second lower sill 70 and the first combustion cavity is defined by a first inner wall 72, a second inner wall (not shown) a rear inner wall 74, a lower inner surface 76 and an upper inner surface 78. In this embodiment, it is contemplated that upper inner surface 78 is analogous to perforated planar element 50 discussed in connection with FIG. 3.

A planar element 90 is provided that protrudes through a slot in the front wall (not shown) and which covers an opening in the lower inner surface of the first combustion cavity as will be discussed in further detail herein.

In this embodiment, the lower inner surface of the first combustion cavity includes a planar grate element 76 and upper inner surface 78 of the first combustion cavity is a perforated planar element and is sloped upwardly from the front wall 12 to the rear wall 19 when fully assembled. In this embodiment, lower sill 70 and lower inner surface are supported by lower lateral supports 42 and a plurality of provided supports 48 that extend from front wall 12 to rear wall 19.

Figure 6:
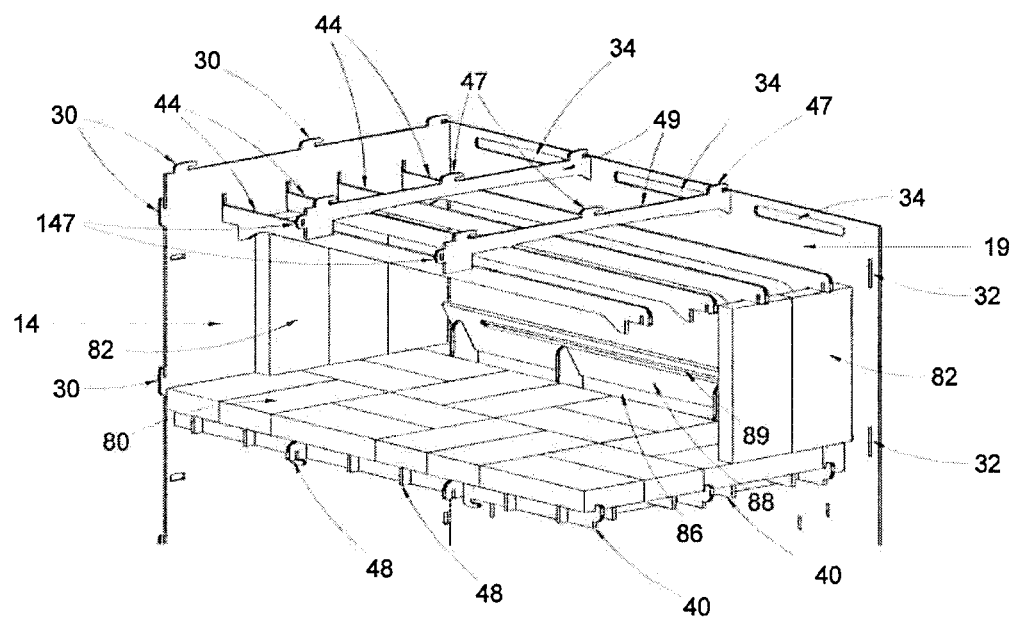
FIG. 6 is another partially assembled perspective view of at least one embodiment of an upper cooking cavity in accordance with the embodiment of FIG. 2.

Turning to FIG. 6, a partially assembled perspective view of at least one embodiment of a second cooking cavity in accordance with the present invention is illustrated. In this embodiment, lower inner surface 80 of second cooking cavity further includes a plurality of refractory bricks that are supported on a planar grid element that is comprised of an interfitting, intersecting grid of lateral supports 40 and supports 48. Moreover, first inner wall 82 and second inner wall 82 of second cooking cavity are also comprised of a plurality of refractory bricks.

In this embodiment, it is further contemplated that a rear horizontal duct 86 is provided that communicates between the first combustion cavity and second cooking cavity. Moreover, a horizontal and upwardly projecting baffle 88 is provided adjacent to rear horizontal duct 86 that is adapted to redirect heat from the first combustion cavity upwardly into the second cooking cavity. In some embodiments, horizontal and upwardly projecting baffle 88 further includes a horizontally extending slot 89.

Moreover, in this embodiment it is contemplated that a number of additional upper lateral supports 44 are provided that extend horizontally between first side wall 14 to second side wall 14 and which provide support for an upper inner surface of the second cooking cavity as will be discussed in further detail herein. Moreover, a plurality of additional supports 49 extend between front wall 12 and rear wall 19 and which provide a supporting surface for the top wall (not shown). Specifically, a number of intermediary angular tabs 47 are provided on each additional support 49 and it is contemplated that each intermediary angular tab 47 is correspondingly received in a corresponding horizontal slot provided on the top wall and a number of tabs 147 are provided at the ends of each additional support 49 and it is contemplated that each tab 147 is correspondingly received in a corresponding vertical slot provided on the front and/or rear wall 19, as will be discussed in further detail below.

Figure 7:
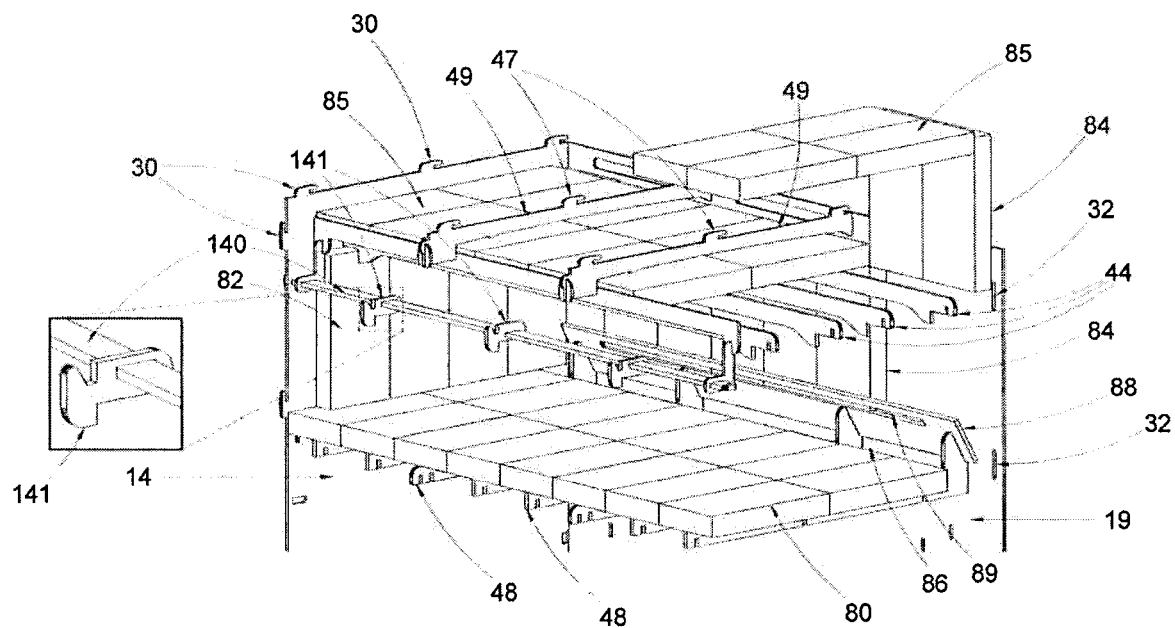
FIG. 7 is another partially assembled perspective view of at least one embodiment of an upper cooking cavity in accordance with the embodiment of FIG. 2.

Turning to FIG. 7, another partially assembled perspective view of at least one embodiment of a second cooking cavity in accordance with the present invention is illustrated. In this embodiment, lower inner surface 80 of the second cooking cavity further includes a plurality of refractory bricks that are supported on a planar grid element that is comprised of a interfitting, intersecting grid of lateral supports (not shown) and supports 48. Moreover, first inner wall 82 and second inner wall (not shown), rear inner wall 84 and upper inner wall 85 of the second cooking cavity are also comprised of a plurality of refractory bricks.

In this embodiment, it is further contemplated that a rear horizontal duct 86 is provided that communicates between the first combustion cavity and second cooking cavity. Moreover, a horizontal and upwardly projecting baffle 88 is provided that is adapted to redirect heat from the first combustion cavity upwardly into the second cooking cavity. In some embodiments, horizontal and upwardly projecting baffle 88 further includes a horizontally extending slot 89.

As will be readily understood by the skilled person, horizontally extending slot 89 is further contemplated to engage a plurality of refractory bricks that form rear inner wall 84 of the second cooking cavity in order to support and bias these refractory bricks against the inner surface of rear wall 19.

Moreover, in this embodiment it is contemplated that a number of additional upper lateral supports 44 are provided that extend horizontally between first side wall 14 to second side wall 14 and which provide support for an upper inner surface of the second cooking cavity as will be discussed in further detail herein. Moreover, a plurality of additional supports 49 extend between front wall 12 and rear wall 19 and which provide a supporting surface for the top wall (not shown). Specifically, a number of intermediary angular tabs 47 are provided on each support 49 and it is contemplated that each intermediary angular tab 47 is correspondingly received in a corresponding horizontal slot provided on the top wall, as will be discussed in further detail below.

In this embodiment, an upper front lateral support 140 is provided that has a plurality of sliding tabs 141. In this embodiment, it is contemplated that each sliding tab 141 has an angular tab (which can be analogous to all other angular tabs discussed herein) that is correspondingly received in a rectangular slot provided in the front wall.

Figure 8:
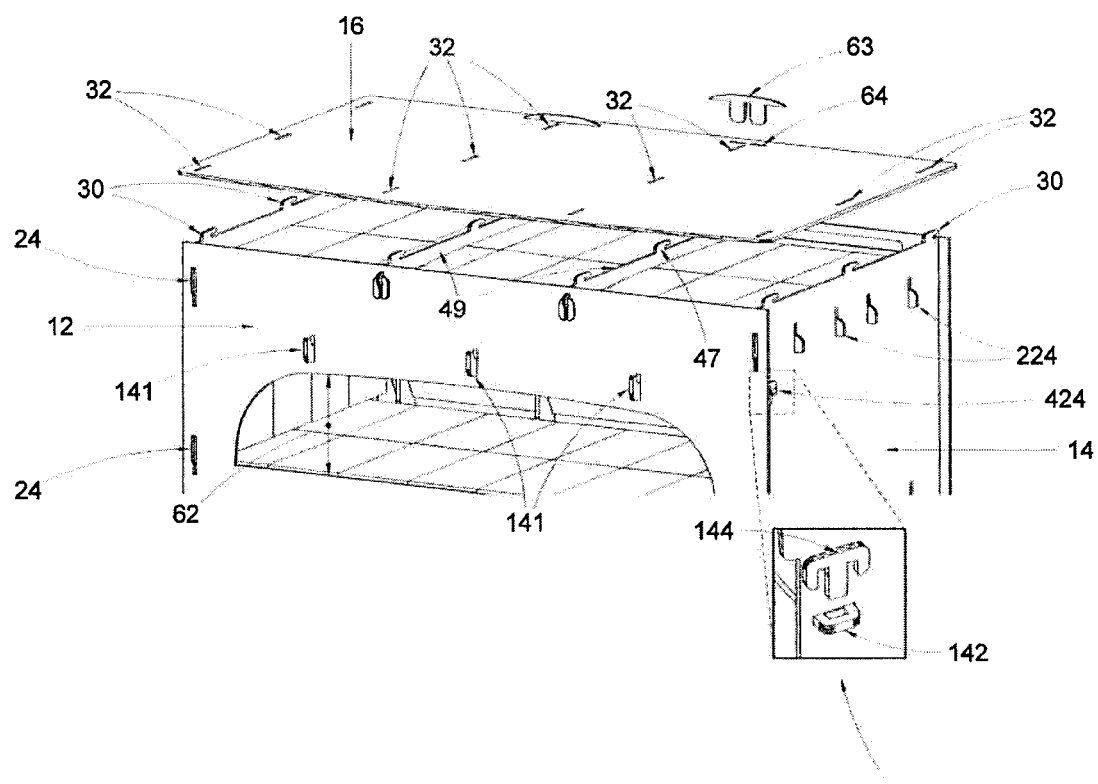
FIG. 8 is a partially assembled perspective view of the top wall of one embodiment of a collapsible and portable oven in accordance with the embodiment of FIG. 2.

Turning to FIG. 8, a partially assembled perspective view of the top wall of one embodiment of a collapsible and portable oven in accordance with the present invention is illustrated. In this embodiment top wall 16 has a plurality of linearly aligned rectangular slots 32 positioned about at least a portion of the perimeter edge of top wall 16 and across the central planar portion of top wall 16. It is contemplated that these slots 32 align and securely engage with a corresponding angular tab 30 provided on the perimeter edge of side wall 14 or an intermediary angular tab 47 provided on additional supports 49 in order to securely but releasably attach top wall 16 to side walls 14 and additional supports 49. Moreover, it is contemplated that an additional perimeter slot 64 is provided adjacent to at least one slot 32 that can receive wedge element 63 in order to secure top wall 16 in place in a secure but releasable manner.

Yet another embodiment of a system of interfitting tabs and slots 424 is illustrated wherein a projecting tab 142 provided on the end of the upper front lateral support 140 has a hole which receives a T-shaped pin 144.

Figure 9:
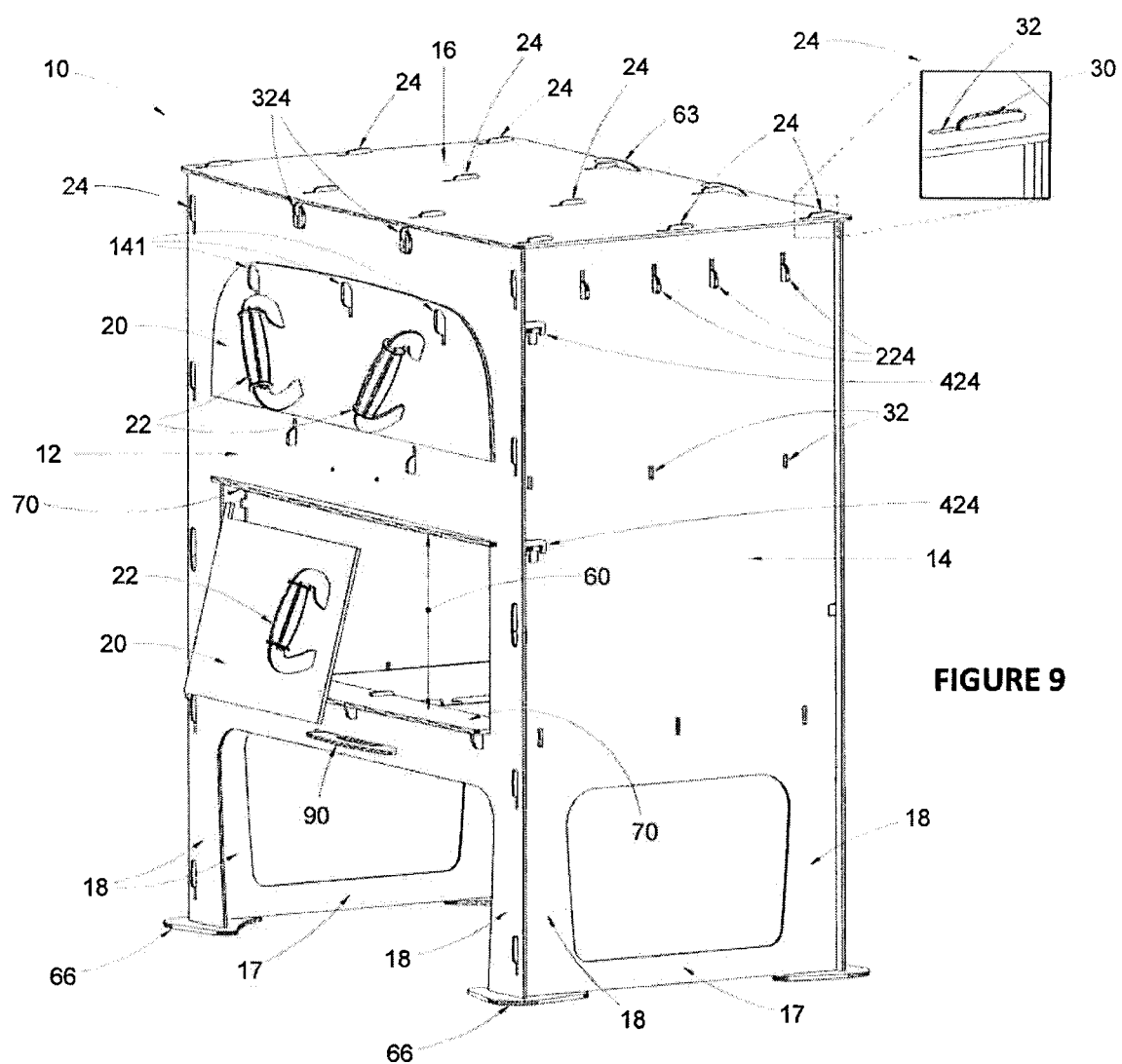
FIG. 9 is a partially assembled perspective view of a collapsible and portable oven in accordance with the embodiment of FIG. 2.

Turning to FIG. 9, a partially assembled perspective view of one embodiment of a collapsible and portable oven in accordance with the present invention is illustrated. In this embodiment, it can be seen that a series of linearly aligned slots 32 provided about at least a portion of the perimeter of front wall 12, rear wall (not shown) and top wall 16 that securely yet releasably engages with a corresponding series of angular tabs 30 that are provided about a portion of the perimeter of the side walls 14 to create a system of interfitting tabs and slots 24 in order to define a rectangularly prismatic oven body. Moreover, linearly aligned slots 32 are also provided about the central sections of front wall 12, rear wall (not shown), side walls 14 and top wall 16 that securely yet releasably engages with a corresponding series of angular tabs provided on the lateral supports to create systems of interfitting tabs and slots 224, 424 that extend between the side walls 14 and on the supports that extend between the front wall 12 and the rear wall (not shown).

In this embodiment it is contemplated that each of front wall 12, side walls 14 and rear wall (not shown) include a plurality of downwardly projecting legs 18 each having a generally planar foot element 66 and which that have horizontal braces 17 extending between a corresponding front leg and second leg.

Moreover, in this embodiment it is contemplated that the at least one opening is a first opening 60 that communicates with a first combustion cavity and a second opening (not shown) that communicates with a second cooking cavity. It is further contemplated that the first opening 60 and the second opening (not shown) each have at least one door 20 having at least one handle 22.

Figure 10:
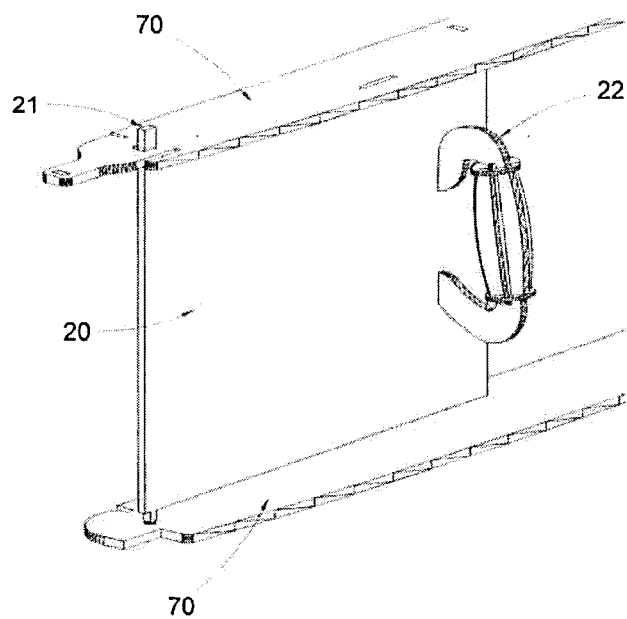
FIG. 10 is a perspective view of one embodiment of a door for a collapsible and portable oven in accordance with the embodiment of FIG. 2.

Turning to FIG. 10, a close-up, perspective view of one embodiment of door 20 is illustrated. In this embodiment, door 20 has projecting posts 21 that are received in corresponding holes provided in sills 70. Moreover, in this embodiment it is contemplated that door 20 includes at least one handle 22.

Figure 11:
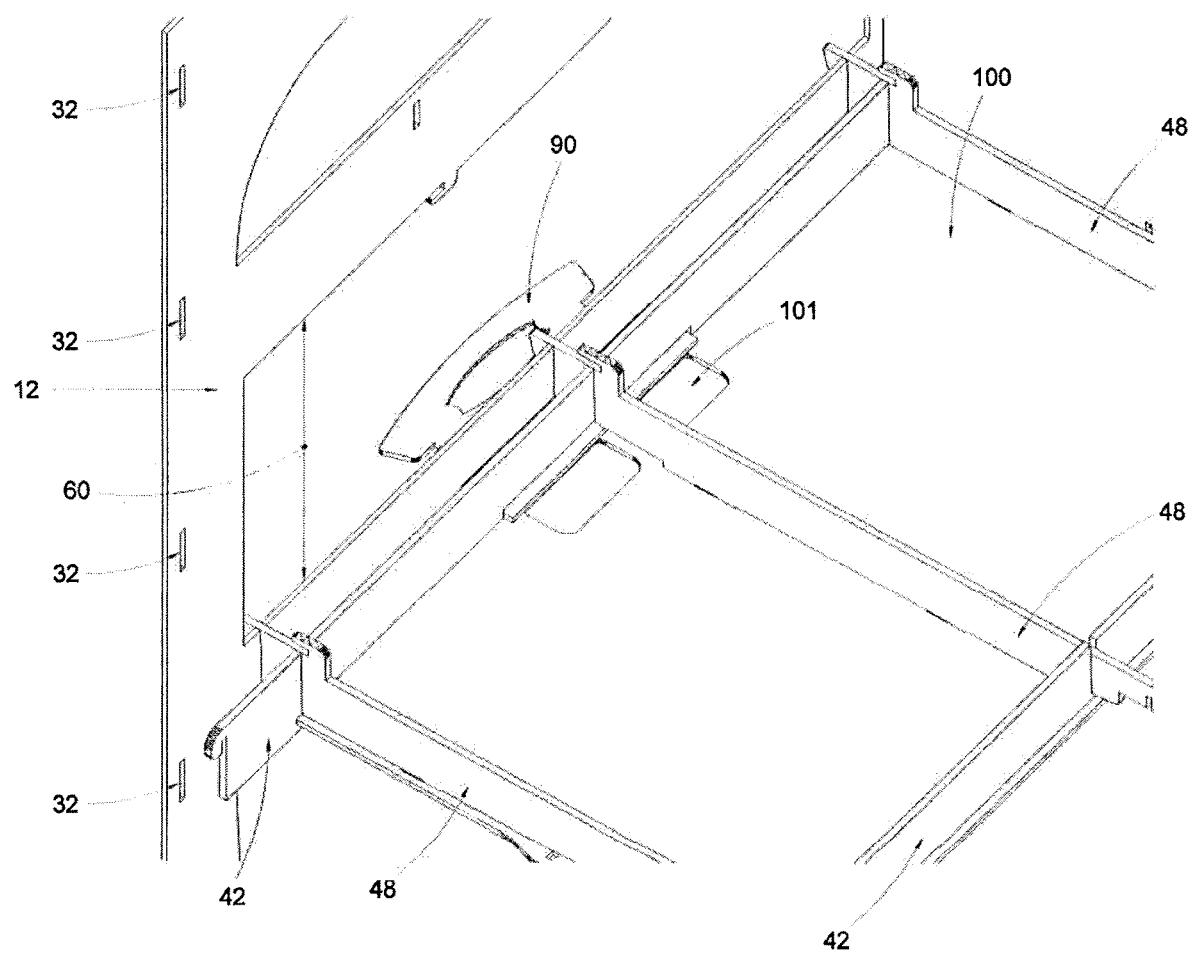
FIG. 11 is a partially assembled perspective view of one embodiment of a lower inner surface of a lower combustion chamber of a collapsible and portable oven in accordance with the embodiment of FIG. 2.

Turning to FIG. 11, a partially assembled, perspective view of one embodiment of a lower inner surface of a first combustion chamber is illustrated. In this embodiment, front wall 12 includes a first opening 60 that communicates with the first combustion chamber and front wall 12 further includes a number of slots 32 that are positioned in linear alignment about its perimeter edges. In this embodiment, supports 48 and lower lateral supports 42 can be seen and which support the oven walls in a generally rectangularly prismatic shape. A lower inner surface 100 of first combustion chamber is provided that is a generally planar surface having an opening 101 that is covered by planar element 90. In this way it is contemplated that planar element 90 can be removed from the horizontal slot provided in front wall 12 in order to scrape ash and solid combustion waste through opening 101 where it can be thereafter replaced to cover opening 101 during use of the oven.

Figure 12:
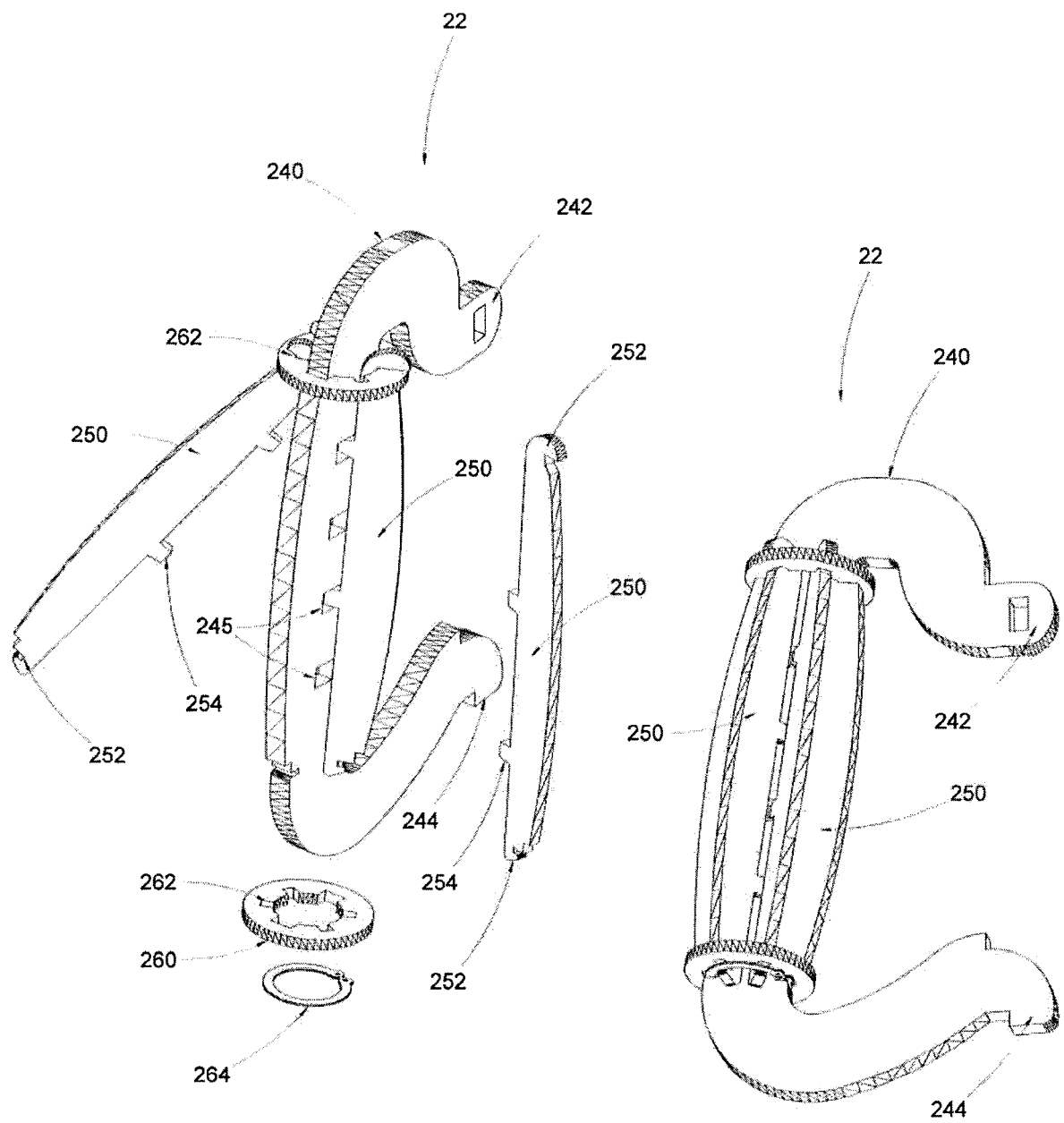
FIG. 12 is a partially assembled perspective view of one, embodiment of a handle for use in connection with a door of a collapsible and portable oven in accordance with the embodiment of FIG. 2.

Finally, turning to FIG. 12, perspective views of one embodiment of a handle for use in connection with the present invention is illustrated. In this embodiment, handle 22 includes an arcuate handle body 240 having a first slotted end 242 and a second tab end 244. In this embodiment arcuate handle body 240 is generally "C" shaped however other shapes are also contemplated. Arcuate handle body 240 can also have a number of slots 245 formed on an inner surface of arcuate handle body 240. Handle 22 is further comprised of a number of longitudinal handle elements 250 which are positioned in a radial manner about a central axis of arcuate handle body 240 and include a first and second notched end 252 and an intermediary tab 254. Securing rings 260 are provided which have a central hole having a number of radially oriented slots 262. At least one locking ring 264 is provided to secure the entire assembly in place.

In this way, it is contemplated that a number of longitudinal handle elements 250 can be positioned in a radial manner about a central axis of arcuate handle body 240 such that slots 245 of arcuate handle body 240 engage tabs 254 of each longitudinal handle element 250. Moreover, it is contemplated that each notched end 252 of each longitudinal handle element 250 engages a corresponding radially oriented slot 262 on a corresponding securing ring 260. Finally, locking ring 264 is provided to secure the entire assembly in place.

This results in a handle element that can be assembled out of simple, stamped components and which does not require any sophisticated mechanical fasteners in order to be assembled in a robust manner. Moreover, first slotted end 242 and a second tab end 244 can be secured in corresponding slots provided in a door of the present collapsible and portable outdoor oven in order to provide safe and secure access to a corresponding internal cavity.

In this way, the present invention provides a collapsible and portable outdoor oven that is economical to manufacture out of readily available bulk materials, features durable and robust construction, is easy to ship in a disassembled state, has modular components that can be replaced if wear or failure becomes an issue and which can be assembled on-site by a relatively unsophisticated user using a minimum of mechanical or otherwise permanent fastening techniques.

While the present invention has been described with reference to particular embodiments it will be apparent to anyone skilled in the art that there are many permutations and combinations of combining the primary response variables to achieve particular benefits. All such permutations and combinations are considered to be within the sphere and scope of this invention as defined in the claims appended hereto.

What is claimed is:

1. A collapsible and portable outdoor oven, comprising:
   a front wall having an upper edge, a first side edge and a second side edge, the front wall having at least one opening at least one of the upper edge, the first side edge and the second side edge having one of a plurality of longitudinally aligned angular tabs and a plurality of longitudinally aligned slots;
   a rear wall having an upper edge, a front edge and a rear edge, at least one of the upper edge, the front edge and the rear edge having one of a plurality of longitudinally aligned angular tabs and a plurality of longitudinally aligned slots;
   a top wall having a front edge, a rear edge, a first side edge and a second side edge, at least one of the front edge, the rear edge, the first side edge and the second side edge having one of a plurality of longitudinally aligned angular tabs and a plurality of longitudinally aligned slots;
   a first side wall having a front edge, a rear edge and an upper edge, at least one of the upper edge, the front edge and the rear edge having one of a plurality of longitudinally aligned angular tabs and a plurality of longitudinally aligned slots;
   a second side wall having a front edge, a rear edge and an upper edge, at least one of the upper edge, the front edge and the rear edge having one of a plurality of longitudinally aligned angular tabs and a plurality of longitudinally aligned slots;
   at least one of the upper edge of the front wall, the upper edge of the rear wall, the upper edge of the first side wall and the upper edge of the second side wall having at least one horizontally extending exhaust slot positioned adjacent to the respective upper edge;
   at least one of the upper edge of the front wall, the upper edge of the rear wall, the upper edge of the first side wall and the upper edge of the second side wall having at least one upwardly and outwardly extending baffle positioned adjacent to the respective upper edge on an inner surface of the respective upper edge;
   at least one internal cavity communicating with the at least one opening of the front wall and having a rear inner wall, a first inner side wall, a second inner side wall and a lower inner surface, at least one of the first side wall, the second side wall, the rear side wall and the lower surface comprised of a plurality of refractory brick elements;
   at least one door element, the at least one door element adapted to cover the at least one opening of the front wall;
   wherein at least one of a plurality of longitudinally aligned angular tabs and a plurality of longitudinally aligned slots of the upper edge of the rear wall are securely received by a corresponding other of the one of a plurality of longitudinally aligned angular tabs and a plurality of longitudinally aligned slots of the rear edge of the top wall, the one of a plurality of longitudinally aligned angular tabs and a plurality of longitudinally aligned slots of the first side edge of the rear wall are securely received by a corresponding other of the one of a plurality of longitudinally aligned angular tabs and a plurality of longitudinally aligned slots of the rear edge of the first side wall, the one of a plurality of longitudinally aligned angular tabs and a plurality of longitudinally aligned slots of the second side edge of the rear wall are securely received by a corresponding other of the one of a plurality of longitudinally aligned angular tabs and a plurality of longitudinally aligned slots of the rear edge of the second side wall, the one of a plurality of longitudinally aligned angular tabs and a plurality of longitudinally aligned slots of the upper edge of the front wall are securely received by a corresponding other of the one of a plurality of longitudinally aligned angular tabs and a plurality of longitudinally aligned slots of the front edge of the top wall, the one of a plurality of longitudinally aligned angular tabs and a plurality of longitudinally aligned slots of the first side edge of the front wall are securely received by a corresponding other of the one of a plurality of longitudinally aligned angular tabs and a plurality of longitudinally aligned slots of the front edge of the first side wall, the one of a plurality of longitudinally aligned angular tabs and a plurality of longitudinally aligned slots of the second side edge of the front wall are securely received by a corresponding other of the one of a plurality of longitudinally aligned angular tabs and a plurality of longitudinally aligned slots of the front edge of the second side wall, the one of a plurality of longitudinally aligned angular tabs and a plurality of longitudinally aligned slots of the first side edge of the top wall are securely received by a corresponding other of the one of a plurality of longitudinally aligned angular tabs and a plurality of longitudinally aligned slots of the upper edge of the first side wall, and the one of a plurality of longitudinally aligned angular tabs and a plurality of longitudinally aligned slots of the second side edge of the top wall are securely received by a corresponding other of the one of a plurality of longitudinally aligned angular tabs and a plurality of longitudinally aligned slots of the upper edge of the second side wall.

2. The collapsible and portable outdoor oven of claim 1 further comprising a plurality of downwardly projecting legs, each of the plurality of downwardly projecting legs having a horizontally planar foot element.

3. The collapsible and portable outdoor oven of claim 1 or claim 2 wherein the lower surface of the at least one internal cavity is further comprised of a planar grid element, the planar grid element supporting at least one refractory brick.

4. The collapsible and portable outdoor oven of claim 3 wherein the planar grid element is comprised of a plurality of lateral supports and a plurality of supports.

5. The collapsible and portable outdoor oven of claim 1 wherein the lower surface of the at least one internal cavity is further comprised of a perforated planar element.

6. The collapsible and portable outdoor oven of claim 1 wherein the at least one door element further comprises at least one of a horizontally extending upper sill and a horizontally extending lower sill.

7. The collapsible and portable outdoor oven of claim 1 wherein the at least one door element further comprises further comprises at least one handle.

8. The collapsible and portable outdoor oven of claim 1 further comprising at least one lateral support extending between an inner surface of the first side wall and an inner surface of the second side wall, each at least one lateral support having a first end and a second end, each of the first end and the second end having an angular tab, the angular tab being securely received in a corresponding slot provided in the respective side wall.

9. The collapsible and portable outdoor oven of claim 1 further comprising at least one support extending between an inner surface of the front wall and an inner surface of the rear wall, each at least one support having a first end and a second end, each of the first end and the second end having an angular tab, the angular tab being securely received in a corresponding slot provided in the respective front wall and rear wall.

10. The collapsible and portable outdoor oven of claim 9 wherein the at least one support further comprises an angular tab located between the first end and the second end, the angular tab being securely received in a corresponding slot provided in an inner surface of the top wall.

11. The collapsible and portable outdoor oven of claim 1 wherein the at least one internal cavity is a first combustion cavity and a second cooking cavity, the first combustion cavity communicating with the second cooking cavity by way of a horizontally extending duct, the horizontally extending duct located rearwardly between the upper inner surface of the first combustion cavity and the lower surface of the second cooking cavity, the upwardly and forwardly projecting baffle positioned rearwardly and adjacent to the horizontally extending duct; and wherein the at least one door element is a first door element and a second door element.

12. The collapsible and portable outdoor oven of claim 11 wherein the second cooking cavity further comprises an upwardly and forwardly projecting baffle positioned rearwardly on the on lower surface of the second cooking cavity, the upwardly and forwardly projecting baffle positioned forward and adjacent to the horizontally extending duct.

13. The collapsible and portable outdoor oven of claim 12 wherein the lower inner surface of the second cooking cavity is a horizontal planar grate.

\* \* \* \* \*